United States Patent
Maya

(10) Patent No.: US 10,884,841 B2
(45) Date of Patent: Jan. 5, 2021

(54) INFORMATION PROCESSING DEVICE, INFORMATION PROCESSING METHOD, AND RECORDING MEDIUM

(71) Applicant: Kabushiki Kaisha Toshiba, Tokyo (JP)

(72) Inventor: Shigeru Maya, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 192 days.

(21) Appl. No.: 16/126,148

(22) Filed: Sep. 10, 2018

(65) Prior Publication Data

US 2019/0220336 A1 Jul. 18, 2019

(30) Foreign Application Priority Data

Jan. 17, 2018 (JP) .................. 2018-005941

(51) Int. Cl.
*G06F 11/07* (2006.01)
(52) U.S. Cl.
CPC ........ *G06F 11/079* (2013.01); *G06F 11/0709* (2013.01); *G06F 11/0751* (2013.01); *G06F 11/0775* (2013.01)
(58) Field of Classification Search
CPC .. G06F 11/079; G06F 11/075; G06F 11/0775; G06F 16/26; G06F 16/2465; G16Y 40/10; G16Y 40/20
See application file for complete search history.

(56) References Cited

U.S. PATENT DOCUMENTS

| | | | |
|---|---|---|---|
| 6,952,662 B2 | 10/2005 | Wegerich et al. | |
| 8,682,824 B2 | 3/2014 | Shibuya et al. | |
| 2012/0041575 A1 | 2/2012 | Maeda et al. | |
| 2013/0173218 A1 | 7/2013 | Maeda et al. | |
| 2014/0279795 A1* | 9/2014 | Shibuya ................. | G06N 20/00 706/46 |
| 2016/0371137 A1* | 12/2016 | Zhao ................... | G06F 11/0709 |
| 2019/0098034 A1* | 3/2019 | Wakasugi ............... | G06T 7/136 |

FOREIGN PATENT DOCUMENTS

| | | |
|---|---|---|
| JP | 2010-191556 A | 9/2010 |
| JP | 2013-143009 A | 7/2013 |
| JP | 2016-103218 A | 6/2015 |
| JP | 2017-102765 A | 6/2017 |
| WO | WO 2011/024352 A1 | 3/2011 |
| WO | WO 2012/032512 A1 | 3/2012 |

\* cited by examiner

*Primary Examiner* — Kamini B Patel
*Assistant Examiner* — Kurosu Risa Altaf
(74) *Attorney, Agent, or Firm* — Finnegan, Henderson, Farabow, Garrett & Dunner, L.L.P.

(57) ABSTRACT

An information processing device has a data generator that generates pseudo data of normal data and pseudo data of abnormal data, on the basis of the normal data, similar data of the normal data, the abnormal data, and similar data of the abnormal data, first update circuitry that updates a first parameter multiplied by the pseudo data of the normal data to obtain an abnormality degree of the pseudo data of the normal data and multiplied by the pseudo data of the abnormal data to obtain an abnormality degree of the pseudo data of the abnormal data, and second update circuitry that updates a second parameter multiplied by the normal data to obtain the similar data of the normal data and a third parameter multiplied by the abnormal data to obtain the similar data of the abnormal data.

20 Claims, 12 Drawing Sheets

| PRODUCT ID | SensorA | SensorB | MANUFACTURING DATE AND TIME |
|---|---|---|---|
| 1 | 1.2 | 3.4 | 4/3 |
| 2 | 2.3 | 2.5 | 5/4 |
| 3 | 3.2 | 4.6 | 6/2 |
| 4 | 2.4 | 1.3 | 7/10 |
| 5 | 5.3 | 3.5 | 8/14 |
| 6 | 4.5 | 7.4 | 9/14 |
| 7 | 4.6 | 2.6 | 10/15 |
| 8 | 4.3 | 2.3 | 11/24 |

FIG. 2

| PRODUCT ID | NORMAL/ABNORMAL |
|---|---|
| 1 | NORMAL |
| 2 | NORMAL |
| 3 | ABNORMAL |
| 4 | NORMAL |
| 5 | ABNORMAL |
| 6 | NORMAL |
| 7 | ABNORMAL |
| 8 | ABNORMAL |

FIG. 3

| CHANGE DATE AND TIME | CONTENTS |
|---|---|
| 4/6 | MAINTENANCE |
| 6/4 | CLEANING |
| 7/4 | SETTING CHANGE |
| 8/23 | MAINTENANCE |

FIG. 4

| PRODUCT ID | SensorA | SensorB | MANUFACTURING DATE AND TIME |
|---|---|---|---|
| 6 | 4.5 | 7.4 | 9/14 |

FIG. 5

| PRODUCT ID | SensorA | SensorB | MANUFACTURING DATE AND TIME |
|---|---|---|---|
| 7 | 4.6 | 2.6 | 10/15 |
| 8 | 4.3 | 2.3 | 11/24 |

FIG. 6

| PRODUCT ID | SensorA | SensorB | MANUFACTURING DATE AND TIME |
|---|---|---|---|
| 1 | 1.2 | 3.4 | 4/3 |
| 2 | 2.3 | 2.5 | 5/4 |
| 3 | 3.2 | 4.6 | 6/2 |
| 4 | 2.4 | 1.3 | 7/10 |
| 5 | 5.3 | 3.5 | 8/14 |

INFORMATION PROCESSING DEVICE, INFORMATION PROCESSING METHOD, AND RECORDING MEDIUM

CROSS REFERENCE TO RELATED APPLICATIONS

This application is based upon and claims the benefit of priority from the prior Japanese Patent Application No. 2018-5941, filed on Jan. 17, 2018, the entire contents of which are incorporated herein by reference.

FIELD

Embodiments of the present invention relate to an information processing device, an information processing method, and a recording medium.

BACKGROUND

With the progress of the Internet of things (IoT), states of various devices, plants, and the like can be grasped in real time. Attempts to determine normality/abnormality of various devices on the basis of data acquired by various sensors are also performed.

However, to correctly identify normality/abnormality of a device, a large amount of data is generally required. In addition, a state of the device is not always constant and setting of the device may also be changed, for example, when maintenance is performed or when some members are exchanged. In the case where a user of the device is changed, even if the same type of object is manufactured by the device, the behavior of the device may be different. Therefore, even if a large amount of data is collected to determine the normality/abnormality, a change in the state of the device during this process may invalidate previous data.

From this kind of circumstance, a method of determining the normality/abnormality by a small amount of data is suggested. However, in the conventional method, similar data of normal data or abnormal data is collected to determine the normality/abnormality. However, the similar data may not be originally selected correctly and there is no guarantee that the normality/abnormality can be determined with high precision.

BRIEF DESCRIPTION OF THE DRAWINGS

FIG. 2 is a diagram showing an example of a manufacturing data recording DB;

FIG. 3 is a diagram showing an example of a normality/abnormality recording DB;

FIG. 4 is a diagram showing an example of a device setting recording DB;

FIG. 5 is a diagram showing an example of a present setting normal data DB;

FIG. 6 is a diagram showing an example of a present setting abnormal data DB;

DETAILED DESCRIPTION

According to one embodiment, an information processing device has a data generator that generates pseudo data of normal data and pseudo data of abnormal data, on the basis of the normal data, similar data of the normal data, the abnormal data, and similar data of the abnormal data, first update circuitry that updates a first parameter multiplied by the pseudo data of the normal data to obtain an abnormality degree of the pseudo data of the normal data and multiplied by the pseudo data of the abnormal data to obtain an abnormality degree of the pseudo data of the abnormal data, and second update circuitry that updates a second parameter multiplied by the normal data to obtain the similar data of the normal data and a third parameter multiplied by the abnormal data to obtain the similar data of the abnormal data.

Hereinafter, embodiments will be described with reference to the drawings. In the present specification and the accompanying drawings, for the sake of easy understanding and convenient illustration, some components are omitted, changed, or simplified and description and illustration are given. However, this embodiment should be interpreted to include technical contents to the extent that the same functions can be expected.

First Embodiment

Figure 1:
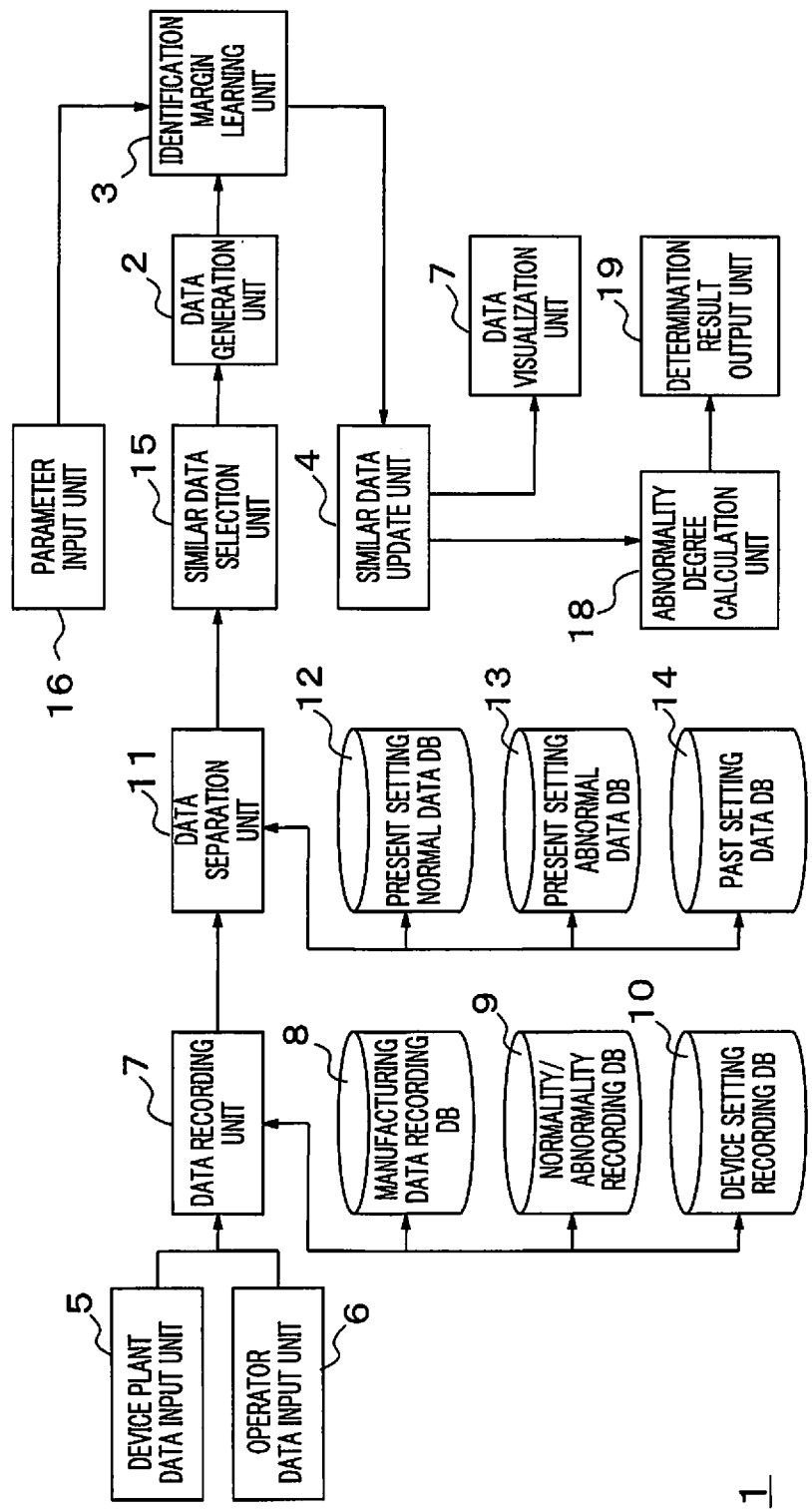
FIG. 1 is a block diagram showing a schematic configuration of an information processing device 1 according to a first embodiment.

FIG. 1 is a block diagram showing a schematic configuration of an information processing device 1 according to a first embodiment. The information processing device 1 of FIG. 1 has a function of determining normality/abnormality of input data from various devices, plants, various sensors, and the like and displaying a determination result. The type of input data input to the information processing device 1 of FIG. 1 is not necessarily one. A plurality of types of input data may be input to the information processing device 1 of FIG. 1.

The information processing device 1 of FIG. 1 includes a data generation unit (data generator) 2, an identification margin learning unit (first update unit, first update circuitry) 3, and a similar data update unit (second update unit, second update circuitry) 4.

The data generation unit 2 generates pseudo data of normal data and pseudo data of abnormal data, on the basis of the normal data, similar data of the normal data, the abnormal data, and similar data of the abnormal data. Here, the normal data, the abnormal data, the similar data of the normal data, and the similar data of the abnormal data are input data actually input at the present time or in the past. On the other hand, the pseudo data of the normal data and the pseudo data of the abnormal data are data generated by the data generation unit 2 and are not the input data actually input. The pseudo data of the normal data and the pseudo data of the abnormal data are used for clearly identifying normality/abnormality.

The identification margin learning unit 3 updates a first parameter that is multiplied by the pseudo data of the normal data to obtain an abnormality degree of the pseudo data of the normal data and that is multiplied by the pseudo data of the abnormal data to obtain an abnormality degree of the pseudo data of the abnormal data. More specifically, the identification margin learning unit 3 updates the first parameter such that a difference between a value obtained by multiplying the pseudo data of the normal data by the first parameter and a value obtained by multiplying the pseudo data of the abnormal data by the first parameter is maximized. In the present specification, a difference between data obtained by multiplying the pseudo data of the normal data by the first parameter and data obtained by multiplying the pseudo data of the abnormal data by the first parameter is called an identification margin. As the identification margin is larger, it is possible to correctly identify the pseudo data of the normal data and the pseudo data of the abnormal data. Therefore, the identification margin learning unit 3 updates the first parameter such that the identification margin is maximized.

The similar data update unit 4 updates a second parameter that is multiplied by the normal data to obtain the similar data of the normal data and a third parameter that is multiplied by the abnormal data to obtain the similar data of the abnormal data. More specifically, the similar data update unit 4 updates the second parameter and the third parameter such that the difference between the value obtained by multiplying the pseudo data of the normal data by the first parameter and the value obtained by multiplying the pseudo data of the abnormal data by the first parameter is maximized.

The information processing device 1 of FIG. 1 may further include at least one of a device plant data input unit 5, an operator data input unit 6, a data recording unit 7, a manufacturing data recording data base (DB) 8, a normality/abnormality recording DB 9, a device setting recording DB 10, a data separation unit 11, a present setting normal data DB (first memory) 12, a present setting abnormal data DB (second memory) 13, a past setting data DB (third memory) 14, a similar data selector 15, a parameter input unit 16, a data visualization unit (data visualization circuitry) 17, an abnormality degree calculation unit (abnormality degree calculation circuitry) 18, and a determination result output unit (determination result output circuitry) 19.

The device plant data input unit 5 takes data from various devices, plants, various sensors, and the like as input data in the information processing device 1 of FIG. 1. The operator data input unit 6 takes in various data (hereinafter, referred to as operator data) input by an operator operating the information processing device 1 of FIG. 1 using a keyboard or the like.

The data recording unit 7 distributes the input data and the operator data to the manufacturing data recording DB 8, the normality/abnormality recording DB 9, and the device setting recording DB 10 to record the data.

The manufacturing data recording DB 8 records, for example, sensor detection data, setting data of various devices, and the like. FIG. 2 is a diagram showing an example of the manufacturing data recording DB 8. The manufacturing data recording DB 8 of FIG. 2 records product IDs of devices providing the input data, detection data of a sensor A, detection data of a sensor B, and manufacturing dates and times of the devices in association with each other. The input data may be either univariate or multivariate. In addition, the input data may be pre-processed and then recorded in the manufacturing data recording DB 8. Pre-processing means adjusting an average value of each input data to zero, performing normalization to adjust a variance of each input data to 1, performing whitening by incorporating a correlation between variables for multivariate data, specifying a maximum value or a minimum value of a value acquired by the detection data of each sensor, performing frequency conversion of the input data, and the like. In addition, the manufacturing data recording DB 8 may record the detection data of the sensors for each manufacturing device as shown in FIG. 2 and may acquire data for each specific time width in the case of not being a manufacturing device. As described above, FIG. 2 shows an example of the manufacturing data recording DB 8 and the type of data recorded in the manufacturing data recording DB 8 is arbitrary.

The normality/abnormality recording DB 9 records information showing whether the input data is normal or abnormal. FIG. 3 is a diagram showing an example of the normality/abnormality recording DB 9. The normality/abnormality recording DB 9 of FIG. 3 includes product IDs of devices providing the input data and information showing normality/abnormality as data items. In the information showing the normality/abnormality, the normality and the abnormality may be distinguished by 0 and 1. When data is recorded for each specific time width, date information showing when the normality/abnormality has been determined may be recorded in the normality/abnormality recording DB 9. As described above, FIG. 3 shows an example of the normality/abnormality recording DB 9 and the data items in the normality/abnormality recording DB 9 are not particularly limited.

The device setting recording DB 10 records dates when setting changes have occurred in various devices or plants and contents of the setting changes. FIG. 4 is a diagram showing an example of the device setting recording DB 10. The device setting recording DB 10 of FIG. 4 records the setting change dates and the setting change contents in association with each other. The device setting recording DB 10 may record information included in data output from various devices or plants, or may record information input by the operator using the operator data input unit 6. The information recorded in the device setting recording DB 10 is information on timing at which the maintenance of the device has been performed or timing at which at least a part of the device has been changed or exchanged. As described above, FIG. 4 shows an example of the device setting recording DB 10 and the data items in the device setting recording DB 10 are not particularly limited.

The data separation unit 11 distributes each data recorded in the manufacturing data recording DB 8, the normality/abnormality recording DB 9, and the device setting recording DB 10 to the present setting normal data DB 12, the present setting abnormal data DB 13, and the past setting data DB 14.

The present setting normal data DB 12 records normal data of present setting extracted from the manufacturing data recording DB 8, the normality/abnormality recording DB 9, and the device setting recording DB 10. FIG. 5 is a diagram showing an example of the present setting normal data DB 12. The present setting normal data DB 12 of FIG. 5 records a product ID, detection data of the sensor A, detection data of the sensor B, and a manufacturing date and time in association with each other.

The present setting abnormal data DB 13 records abnormal data of the present setting extracted from the manufacturing data recording DB 8, the normality/abnormality recording DB 9, and the device setting recording DB 10. FIG. 6 is a diagram showing an example of the present setting abnormal data DB 13. The present setting abnormal data DB 13 of FIG. 6 records product IDs, detection data of the sensor A, detection data of the sensor B, and manufacturing dates and times in association with each other.

Figures 7, 8:
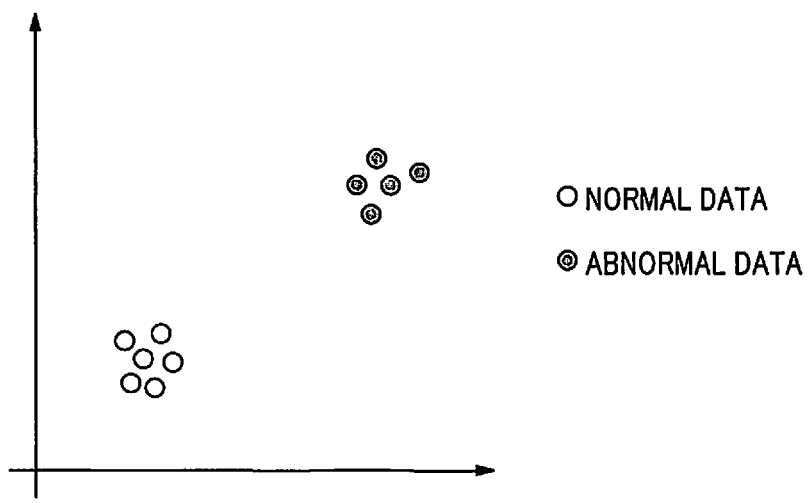
FIG. 7 is a diagram showing an example of a past setting data DB.
FIG. 8 is a diagram in which pseudo data X of normal data x and pseudo data Y of abnormal data y are plotted in a two-dimensional coordinate space.

The past setting data DB 14 records data of past setting that is not the present setting. FIG. 7 is a diagram showing an example of the past setting data DB 14. The past setting data DB 14 of FIG. 7 records product IDs, detection data of the sensor A, detection data of the sensor B, and manufacturing dates and times in association with each other. When the past setting data DB 14 is generated, only data of setting immediately before the present setting may be recorded or all data other than the data of the present setting among the data stored in the manufacturing data recording DB 8 may be recorded.

The similar data selector 15 selects data similar to the present setting normal data recorded in the present setting normal data DB 12 from the past setting data DB 14. In addition, the similar data selector 15 selects data similar to the present setting abnormal data recorded in the present setting abnormal data DB 13 from the past setting data DB 14. The similar data selector 15 may distinguish similar data and non-similar data among the data recorded in the past setting data DB 14 by binary values. In addition, the similar data selector 15 may calculate similarity degrees between the normal and abnormal data of the present setting and the normal and abnormal data of the past setting by using a weight of 0 to 1.

The following formula (1) is a formula for calculating a similarity degree with the past normal data and the following formula (2) is a formula for calculating a similarity degree with the past abnormal data. A function σ in the formulas (1) and (2) is, for example, a sigmoid function.

$$P_{normal}^{past}(x) = \sigma(x \cdot w_{normal}^{past}) \quad (1)$$

$$P_{abnormal}^{past}(x) = \sigma(x \cdot w_{abnormal}^{past}) \quad (2)$$

When there is only one piece of normal data x in the present setting data, the data generation unit 2 calculates pseudo data X of the normal data x by the following formula (3).

$$X = x + \{P_{normal}^{past}(x)x_{normal}^{past} + P_{abnormal}^{past}(x)x_{abnormal}^{past}\} \quad (3)$$

In addition, when there is only one piece of abnormal data y in the present setting data, the data generation unit 2 calculates pseudo data Y of the abnormal data y by the following formula (4).

$$Y = y + \{P_{normal}^{past}(y)x_{normal}^{past} + P_{abnormal}^{past}(y)x_{abnormal}^{past}\} \quad (4)$$

On the other hand, when there are a plurality of pieces of normal data x in the present setting data, not only the similarity degrees shown in the formulas (1) and (2) but also a formula for calculating a similarity degree with the present setting normal data shown in a formula (5) and a formula for calculating a similarity degree with the present setting abnormal data shown in a formula (6) are required. A function σ in the formulas (5) and (6) is, for example, a sigmoid function.

$$P_{normal}^{present}(x) = \sigma(x \cdot w_{normal}^{present}) \quad (5)$$

$$P_{abnormal}^{present}(x) = \sigma(x \cdot w_{abnormal}^{present}) \quad (6)$$

When there are a plurality of pieces of normal data x in the present setting data, the data generation unit 2 calculates the pseudo data X of the normal data x by the following formula (7).

$$X = x + \{P_{normal}^{present}(x)x_{normal}^{present} + P_{abnormal}^{present}(x)x_{abnormal}^{present}\} + \\ \{P_{normal}^{past}(x)x_{normal}^{past} + P_{abnormal}^{past}(x)x_{abnormal}^{past}\} \quad (7)$$

When there are a plurality of pieces of abnormal data y in the present setting data, the data generation unit 2 calculates the pseudo data Y of the abnormal data y by the following formula (8).

$$Y = y + \{P_{normal}^{present}(y)x_{normal}^{present} + P_{abnormal}^{present}(y)x_{abnormal}^{present}\} + \\ \{P_{normal}^{past}(y)x_{normal}^{past} + P_{abnormal}^{past}(y)x_{abnormal}^{past}\} \quad (8)$$

A similarity degree P of the right side in the formulas (4) and (8) is a value calculated by changing the normal data x of the formulas (1), (2), (5), and (6) to the abnormal data y.

FIG. 8 is a diagram in which the pseudo data X of the normal data x and the pseudo data Y of the abnormal data y are plotted in a two-dimensional coordinate space. To clearly identify the pseudo data X and the pseudo data Y, the identification margin learning unit 3 of FIG. 1 updates the first parameter such that a distance (also referred to as an identification margin) between data obtained by multiplying the pseudo data X by the first parameter and data obtained by multiplying the pseudo data Y by the first parameter is maximized. In addition, the similar data update unit 4 updates the second and third parameters such that the distance between the data obtained by multiplying the pseudo data X by the first parameter and the data obtained by multiplying the pseudo data Y by the first parameter is maximized. The second and third parameters are equivalent to the similarity degrees of the formulas (1) to (4) described above.

The abnormality degree calculation unit 18 multiplies the pseudo data of the normal data by the first parameter to calculate the abnormality degree of the normal data and multiplies the pseudo data of the abnormal data by the first parameter to calculate the abnormality degree of the abnormal data. The first parameter is updated by the identification margin learning unit 3.

The determination result output unit 19 outputs a determination result on whether the pseudo data of the normal data and the pseudo data of the abnormal data are normal or abnormal, on the basis of the abnormality degree calculated by the abnormality degree calculation unit 18.

The data visualization unit 17 repeats updating of the first parameter by the identification margin learning unit 3 and updating of the second parameter and the third parameter by the similar data update unit 4 by the predetermined number of times and performs visualization of the pseudo data of the normal data and the pseudo data of the abnormal data by using the first, second, and third parameters after the repetition of updating by the predetermined number of times. The data visualization unit 17 may visualize the normal data, the similar data of the normal data, the pseudo data of the normal data, the abnormal data, the similar data of the abnormal data, and the pseudo data of the abnormal data. In addition, the data visualization unit 17 may visualize information on the identification margin representing the difference between the pseudo data of the normal data and the pseudo data of the abnormal data. Furthermore, the data visualization unit 17 may visualize a first curve representing a time change of the similar data of the normal data and a second curve representing a time change of the similar data of the abnormal data.

Figure 9:
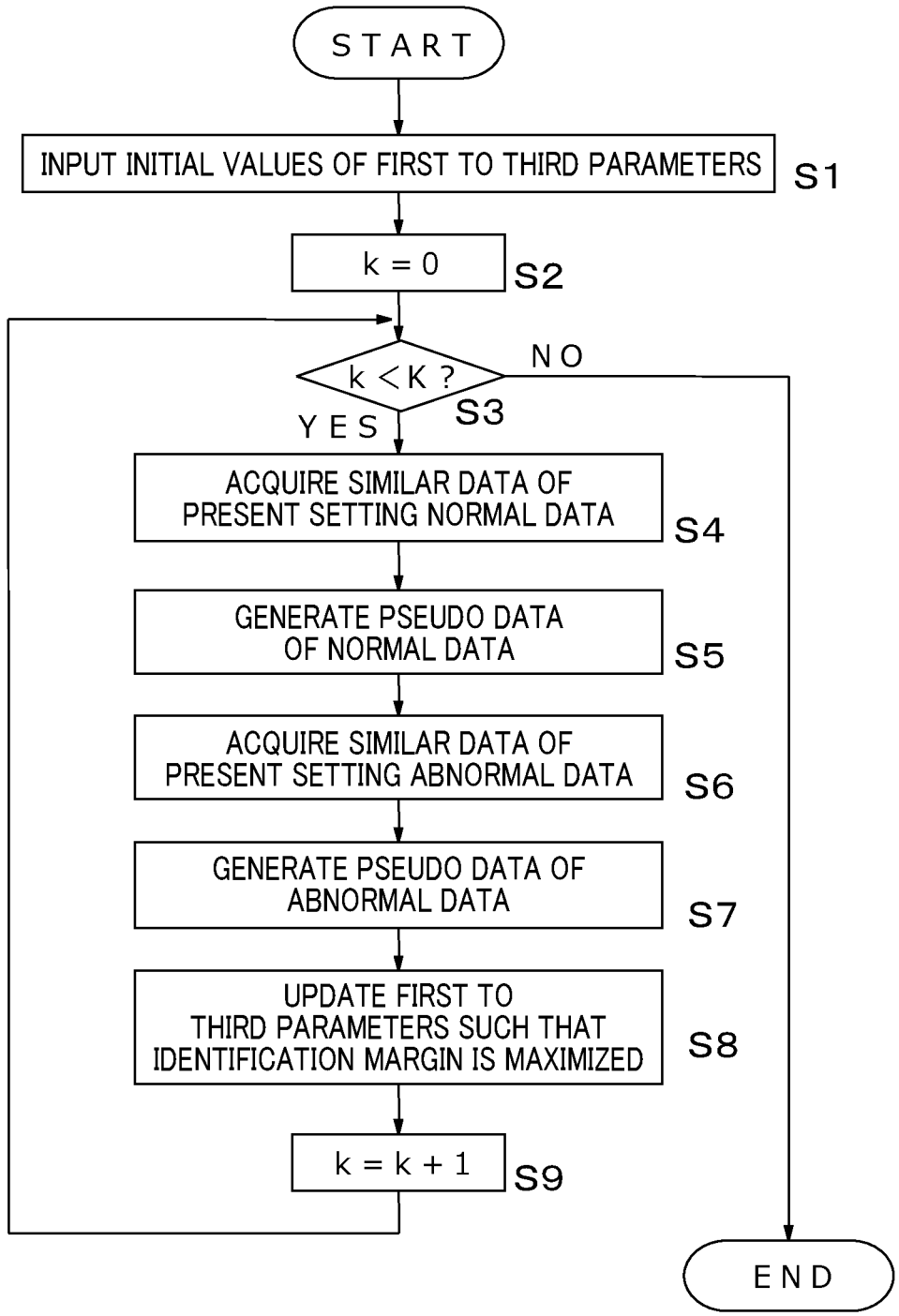
FIG. 9 is a flowchart illustrating an example of a processing operation of a similar data update unit of FIG. 1.

FIG. 9 is a flowchart illustrating an example of a processing operation of the similar data update unit 4 of FIG. 1. First, initial values of the first parameter used by the identification margin learning unit 3 to learn the identification margin and the second and third parameters used by the similar data update unit to obtain the similar data of the normal data and the abnormal data are input from the parameter input unit 16 (step S1).

Next, an upper limit value K of the number of iterations of processing is acquired and the number of iterations k is set to 0 (step S2). Next, it is determined whether or not k<K is satisfied (step S3). When k<K is satisfied, the similar data similar to the present normal data is selected by the similar data selector 15 and the selected similar data is acquired from the past setting data DB 14 (step S4). Next, the pseudo data of the normal data is generated on the basis of the present normal data and the similar data of the normal data (step S5). Here, the pseudo data of the normal data is generated on the basis of the formula (5) described above.

Before or after the processing in steps S4 and S5, the similar data similar to the present abnormal data is selected by the similar data selector 15 and the selected similar data is acquired from the past setting data DB 14 (step S6). Next, the pseudo data of the abnormal data is generated on the basis of the present abnormal data and the similar data of the abnormal data (step S7). In this case, the pseudo data of the abnormal data is generated on the basis of the formula (6) described above.

The first to third parameters are updated such that the identification margin representing the difference between the data obtained by multiplying the pseudo data of the normal data by the first parameter and the data obtained by multiplying the pseudo data of the abnormal data by the first parameter is maximized (step S8).

In this embodiment, as shown in the following formula (9), using the difference between the data obtained by multiplying the pseudo data of the normal data by the first parameter and the data obtained by multiplying the pseudo data of the abnormal data by the first parameter as an objective function, a model that maximizes the objective function is generated.

$$\max_{w, w_{normal}^{past}, w_{abnormal}^{past}} \|X \cdot w - Y \cdot w\| \quad (9)$$

The pseudo data X of the normal data of the formula (9) is calculated by the formula (5) and the pseudo data Y is calculated by the formula (6). w is the first parameter.

If the processing of step S8 ends, the number of iterations k is incremented by 1 (step S9) and the process returns to step S3. If it is determined in step S3 that k≥K is satisfied, the processing of FIG. 9 ends.

Figure 10:
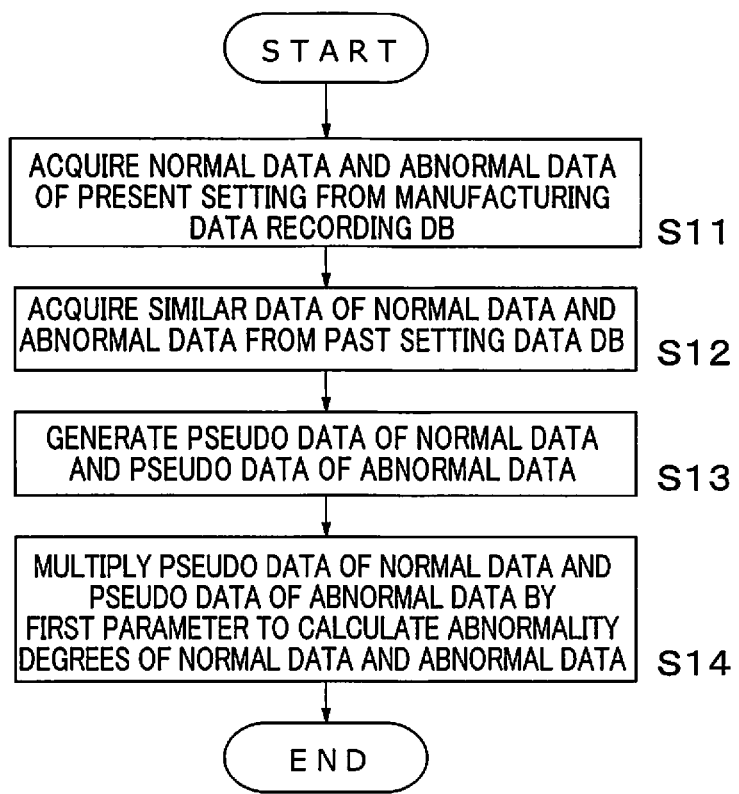
FIG. 10 is a flowchart illustrating an example of a processing operation of an abnormality degree calculation unit of FIG. 1.

FIG. 10 is a flowchart illustrating an example of a processing operation of the abnormality degree calculation unit 18 of FIG. 1. First, the normal data and the abnormal data of the present setting are acquired from the manufacturing data recording DB 8 (step S11). Next, the similar data of the normal data and the abnormal data is selected from the similar data selector 15 and the selected similar data is acquired from the past setting data DB 14 (step S12).

Next, the pseudo data of the normal data and the pseudo data of the abnormal data are generated on the basis of the normal data and the abnormal data acquired in step S11 and the similar data of the normal data and the similar data of the abnormal data acquired in step S12 (step S13). Next, the pseudo data of the normal data and the pseudo data of the abnormal data are multiplied by the first parameter learned by the identification margin learning unit 3 to calculate the abnormality degree of the normal data and the abnormality degree of the abnormal data (step S14).

Figure 11:
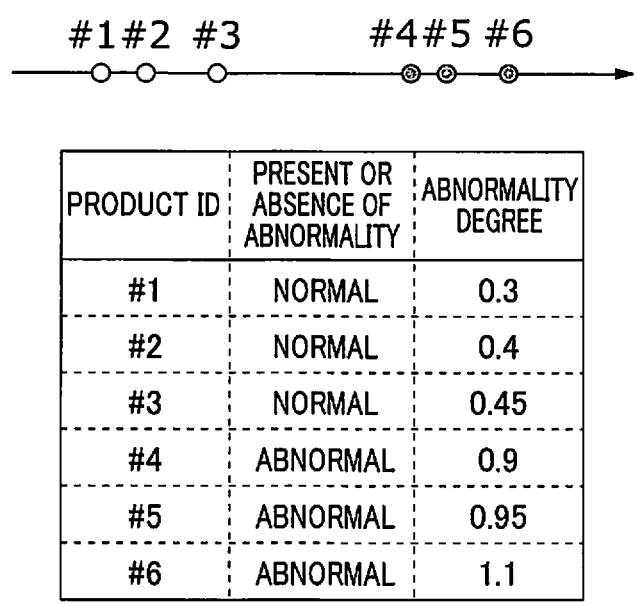
FIG. 11 is a diagram showing an example in which presence or absence of abnormality and an abnormality degree are output in a tabular form and the abnormality degree is plotted in a one-dimensional direction.

The determination result output unit 19 determines normality/abnormality for each device on the basis of the abnormality degree calculated by the abnormality degree calculation unit 18 and outputs a determination result. FIG. 11 is a diagram showing the determination result output by the determination result output unit 19. FIG. 11 shows an example in which presence or absence of abnormality and an abnormality degree are output in a tabular form for each of six products having product IDs #1 to #6 and the abnormality degree is plotted in a one-dimensional direction. As shown in FIG. 11, by updating the first parameter by the identification margin learning unit 3, it is possible to cause the abnormality degree of the normal data and the abnormality degree of the abnormal data to be greatly different from each other and it is easy to identify the normal data and the abnormal data.

Figure 12:
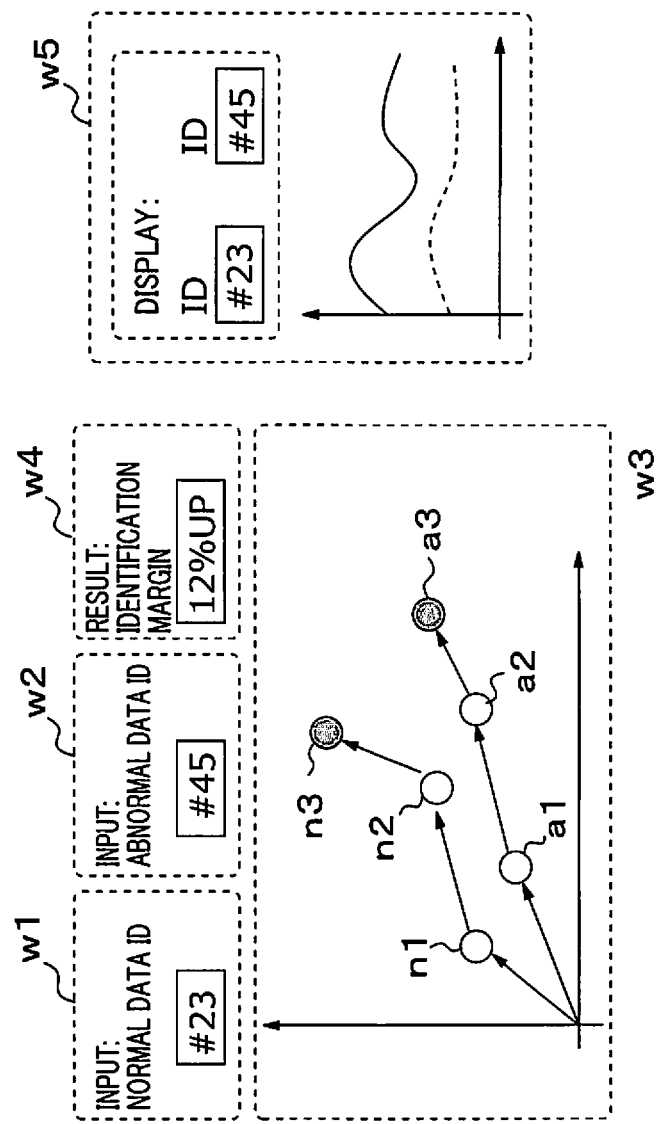
FIG. 12 is a diagram showing an example of visualization by a data visualization unit.

FIG. 12 is a diagram showing an example of visualization by the data visualization unit 17. FIG. 12 shows an example of displaying a visualized result on a screen of a display device not shown in the drawings. In a display region w1 of FIG. 12, an ID of the normal data of the present setting is input by the operator. In a display region w2, an ID of the abnormal data of the present setting is input by the operator.

In a display region w3, normal data n1, pseudo data n2 and n3 of the normal data, abnormal data a1, and pseudo data a2 and a3 of the abnormal data are shown. The pseudo data of the normal data n1 finally becomes the pseudo data n3 by repeating updating. Similarly, the pseudo data of the abnormal data a1 finally becomes the pseudo data a3 by repeating the updating.

A distance between the pseudo data n3 and a3, that is, an identification margin is wider than an identification margin between the normal data n1 and the pseudo data n2 and the pseudo data n3 and a3 can be easily identified. In a display region w4 of FIG. 12, a ratio of the identification margin between the updated pseudo data n3 and a3 with respect to the identification margin between the normal data and the abnormal data of the present setting is displayed by a percentage. In a display region w5 of FIG. 12, a waveform of the normal data or the abnormal data of the present setting is displayed.

FIG. 12 shows an example of visualization and a specific aspect of the visualization is arbitrary. For example, only a part of the display regions w1 to w5 in FIG. 12 may be displayed or information other than the display regions w1 to w5 may be visualized.

As described above, in the first embodiment, the first parameter multiplied by the pseudo data of the normal data and the pseudo data of the abnormal data is updated, and the second parameter multiplied by the similar data of the normal data and the third parameter multiplied by the pseudo data of the abnormal data are updated. Therefore, even if the number of input data is small, the identification margin between the pseudo data of the normal data and the pseudo data of the abnormal data can be made clear. As a result, the number of input data required for clearly identifying the normality/abnormality can be greatly reduced.

Second Embodiment

Figure 13:
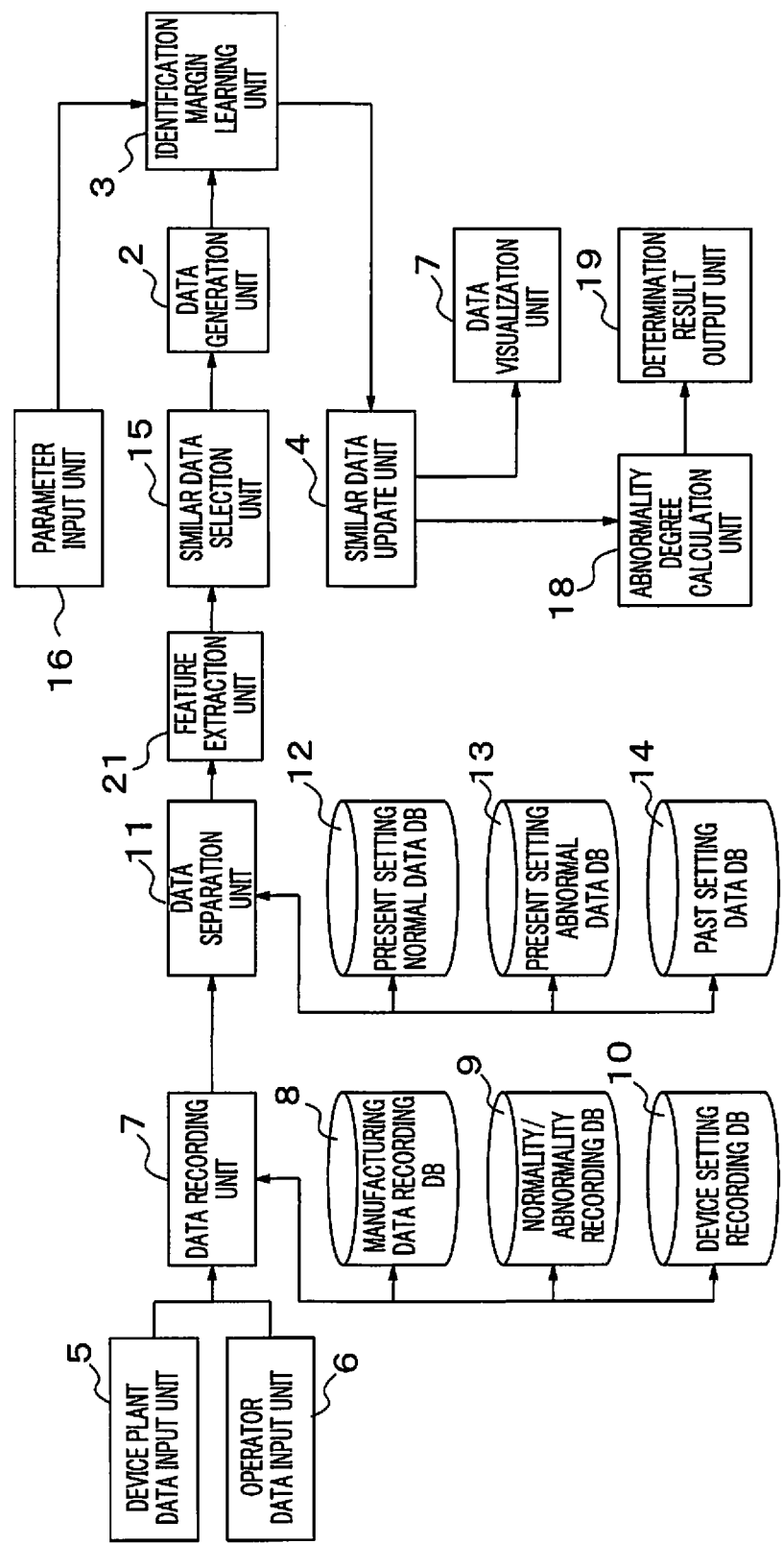
FIG. 13 is a block diagram showing a schematic configuration of an information processing device 1 according to a second embodiment.

FIG. 13 is a block diagram showing a schematic configuration of an information processing device 1 according to a second embodiment. The information processing device 1 of FIG. 13 includes a feature extraction unit (feature extraction circuitry) 21 in addition to the configuration of the information processing device 1 of FIG. 1. The feature extraction unit 21 generates feature extraction data in which features of data read from a present setting normal data DB 12, a present setting abnormal data DB 13, and a past setting data DB 14 are extracted. More specifically, the feature extraction unit 21 performs data conversion without using the data recorded in the present setting normal data DB 12, the present setting abnormal data DB 13, and the past setting data DB 14 as they are and extracts useful features. In particular, when data recorded in a manufacturing data recording DB 8 is image data, it is the de facto standard to extract the features using a convolutional neural network (CNN) or the like. Also, in detection data of each sensor, a feature of the data is often known by removing noise or adjusting a frequency. In addition, even if non-linear transformation is simply performed, expressiveness becomes richer and improvement of identification performance is expected. Therefore, the feature extraction unit 21 can automatically adjust an extraction method using, for example, an error back propagation method.

Figure 14:
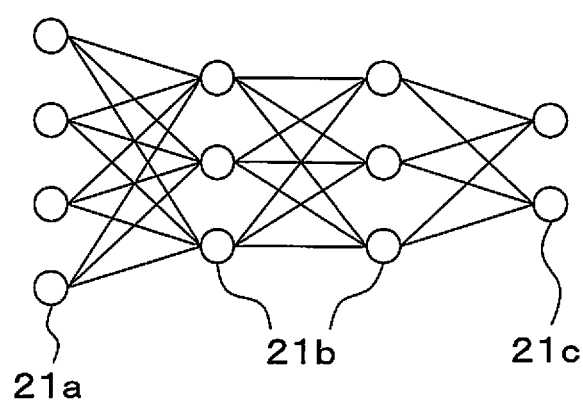
FIG. 14 is a diagram showing an example of an internal configuration of a feature extraction unit.

FIG. 14 is a diagram showing an example of an internal configuration of the feature extraction unit 21. The feature extraction unit 21 of FIG. 14 has an input layer 21a, one or more intermediate layers 21b, and an output layer 21c. A separate weight may be added to each path between the input layer 21a and the intermediate layers 21b. In the example of FIG. 14, four pieces of data are input to the input layer 21a and two pieces of data are output from the output layer 21c via the intermediate layers 21b. By using the feature extraction unit 21 of FIG. 14, four-dimensional data can be converted into two-dimensional data.

In the information processing device 1 of FIG. 13, the feature extraction unit 21 is provided between a data separation unit 11 and a similar data selector 15. Therefore, each data recorded in the present setting normal data DB 12, the present setting abnormal data DB 13, and the past setting data DB 14 is once input to the feature extraction unit 21, the features are extracted, and the extracted features are input to the similar data selector 15.

As such, in the second embodiment, instead of directly inputting each data recorded in the present setting normal data DB 12, the present setting abnormal data DB 13, and the past setting data DB 14 to the similar data selector 15, the data from which the features have been extracted is input to the similar data selector 15. Therefore, an identification margin between pseudo data of normal data and pseudo data of abnormal data can be further increased.

Third Embodiment

There may be the case where pseudo data of normal data and pseudo data of abnormal data have a plurality of identification boundaries. In this case, an identification margin exists for each identification boundary. Therefore, in the third embodiment, it is assumed that a plurality of identification margins exist.

Figure 15:
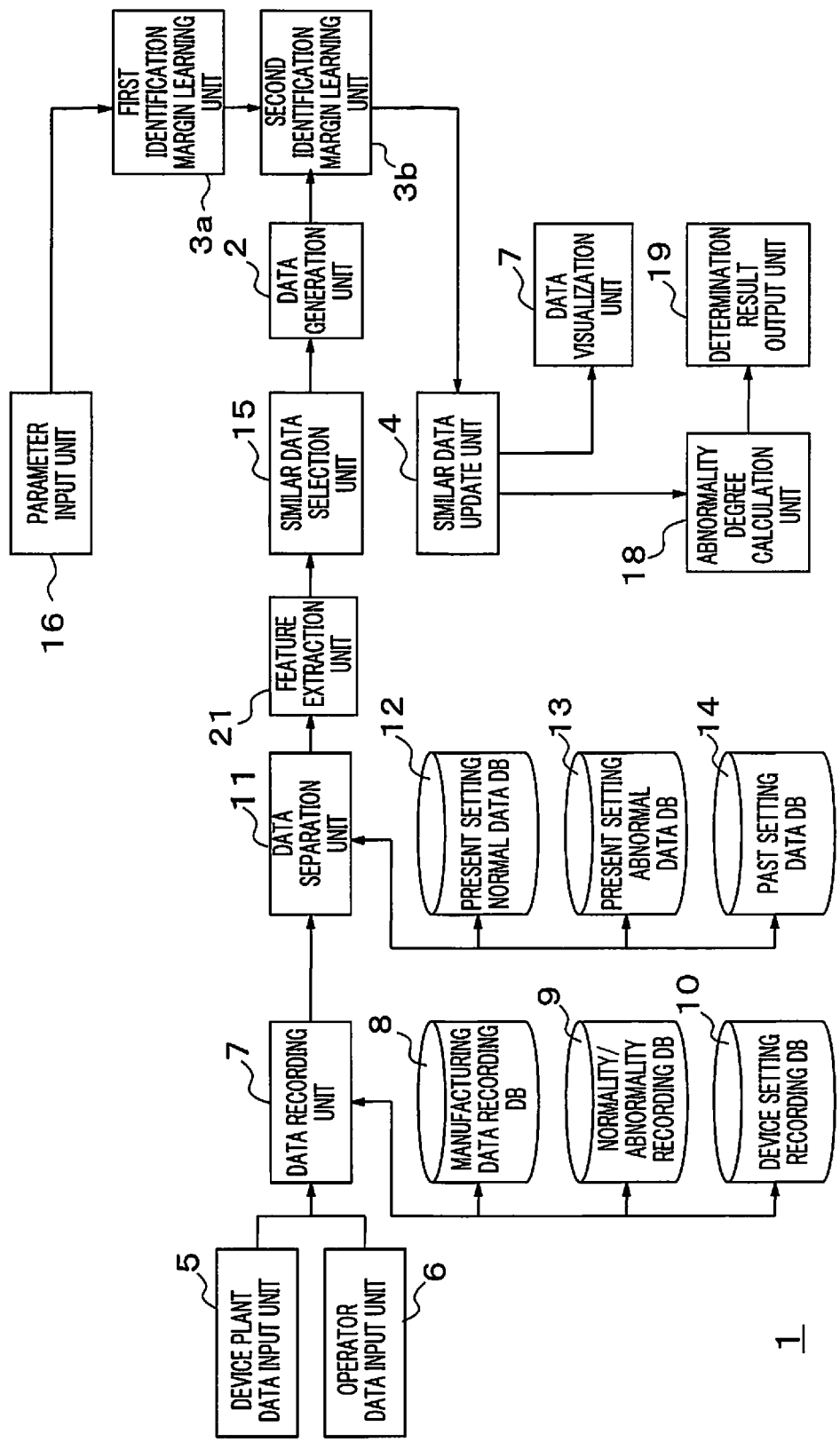
FIG. 15 is a block diagram showing a schematic configuration of an information processing device 1 according to a third embodiment.

FIG. 15 is a block diagram showing a schematic configuration of an information processing device 1 according to the third embodiment. The information processing device 1 of FIG. 15 is different from the information processing device 1 of FIG. 13 in that a plurality of identification margin learning units 3 are provided. In an example of FIG. 13, first and second identification margin learning units 3a and 3b are provided. However, when three or more identification boundaries, that is, three or more abnormal modes exist, it is desirable to provide the identification margin learning units 3 according to the number of identification boundaries (abnormal modes).

Figure 16:
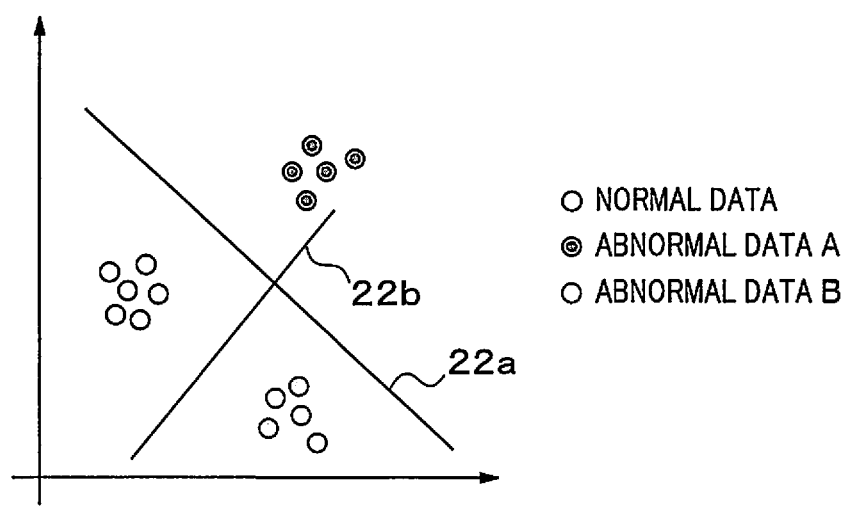
FIG. 16 is a diagram schematically showing an example in which normal data and abnormal data have two identification boundaries.

The first and second identification margin learning units 3a and 3b update a first parameter such that identification margins at the corresponding identification boundaries are maximized. FIG. 16 is a diagram schematically showing an example in which normal data and abnormal data have two identification boundaries 22a and 22b. In the case of FIG. 16, the first identification margin learning unit 3a updates first to third parameters described above such that an identification margin for the identification boundary 22a is as large as possible and the second identification margin learning unit 3b updates the first to third parameters such that an identification margin for the identification boundary 22b is as large as possible.

When the plurality of identification margin learning units 3 are provided as in the information processing device 1 of FIG. 15 and a plurality of abnormal modes exist, it is possible to clearly identify normality/abnormality for each abnormal mode. Although the information processing device 1 of FIG. 15 includes a feature extraction unit 21, the feature extraction unit 21 may not be provided, similar to the first embodiment.

At least a part of the information processing device 1 described in each of the embodiments described above may be configured by hardware or software. When at least the part of the information processing device 1 is configuring by the software, a program for realizing at least a part of functions of the information processing device 1 may be stored in a recording medium such as a flexible disk and a CD-ROM and may be read by a computer for execution. The recording medium is not limited to a detachable recording medium such as a magnetic disk and an optical disk and may be a fixed type recording medium such as a hard disk device and a memory.

In addition, the program for realizing at least the part of the functions of the information processing device 1 may be distributed via a communication line (including wireless communication) such as the Internet. Furthermore, in a state in which the program may be encrypted, modulated, or compressed, the program may be distributed via a wired line such as the Internet or a wireless line or may be stored in a recording medium for distribution.

While certain embodiments have been described, these embodiments have been presented by way of example only, and are not intended to limit the scope of the inventions.

Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An information processing device comprising:
a processing circuitry in communication with a plurality of sensors and configured to:
acquire detection data from the plurality of sensors, the plurality of sensors being associated with manufacturing devices;
generate pseudo data of normal data and pseudo data of abnormal data, on the basis of the normal data, similar data of the normal data, the abnormal data, and similar data of the abnormal data, the normal data comprising the detection data, the similar data of the normal data and the similar data of the abnormal data having a similarity degree with past normal data and past abnormal data respectively;
update a first parameter that is multiplied by the pseudo data of the normal data to obtain an abnormality degree of the pseudo data of the normal data and multiplied by the pseudo data of the abnormal data to obtain an abnormality degree of the pseudo data of the abnormal data; and
update a second parameter that is multiplied by the normal data to obtain the similar data of the normal data and a third parameter that is multiplied by the abnormal data to obtain the similar data of the abnormal data,
wherein:
the first parameter is updated such that a difference between data obtained by multiplying the pseudo data of the normal data by the first parameter and data obtained by multiplying the pseudo data of the abnormal data by the first parameter is maximized; and
the second parameter and the third parameter are updated such that the difference between the data obtained by multiplying the pseudo data of the normal data by the first parameter and the data obtained by multiplying the pseudo data of the abnormal data by the first parameter is maximized.

2. The information processing device according to claim 1, further comprising:
a first memory that stores the normal data among present setting data;
a second memory that stores the abnormal data among the present setting data; and
a third memory that stores data input in the past, wherein
the processing circuitry is further configured to select the similar data of the normal data obtained by multiplying the normal data stored in the first memory by the second parameter and the similar data of the abnormal data obtained by multiplying the abnormal data stored in the second memory by the third parameter, from the third memory.

3. The information processing device according to claim 2, wherein
the processing circuitry is further configured to generate feature extraction data in which features of data read from the first memory and the second memory are extracted,
wherein
the processing circuitry selects the similar data of the normal data and the similar data of the abnormal data obtained by multiplying the feature extraction data by the second parameter and the third parameter, from the third memory, and
generating the feature extraction data comprising using a convolutional neural network.

4. The information processing device according to claim 3, wherein the processing circuitry is further configured to remove noise from the detection data and apply a non-linear transformation to improve identification performance by the convolutional neural network.

5. The information processing device according to claim 1, wherein the processing circuitry is further configured to:
multiply the pseudo data of the normal data and the pseudo data of the abnormal data by the first parameter to calculate the abnormality degree of the pseudo data of the normal data and the abnormality degree of the pseudo data of the abnormal data; and
output a determination result on whether the pseudo data of the normal data and the pseudo data of the abnormal data are normal or abnormal, on the basis of the abnormality degrees calculated by the abnormality degree calculator.

6. The information processing device according to claim 1, wherein the processing circuitry is further configured to repeat updating of the first parameter by the first update circuitry and updating of the second and third parameters by the second update circuitry by a predetermined number of times and performs visualization of the pseudo data of the normal data and the pseudo data of the abnormal data by using the first, second, and third parameters after the repetition of updating by the predetermined number of times.

7. The information processing device according to claim 6, wherein the processing circuitry is further configured to visualize information on an identification margin representing a difference between the pseudo data of the normal data and the pseudo data of the abnormal data.

8. The information processing device according to claim 6, wherein the processing circuitry is further configured to visualize a first curve representing a time change of the similar data of the normal data and a second curve representing a time change of the similar data of the abnormal data.

9. The information processing device according to claim 1, wherein
the processing circuitry is configured to update the first parameter such that a difference between data obtained by multiplying the pseudo data of the normal data by the first parameter and data obtained by multiplying the pseudo data of the abnormal data by the first parameter is maximized for each identification boundary, when the pseudo data of the normal data and the pseudo data of the abnormal data have a plurality of identification boundaries, and
update the second and third parameters such that the difference between the data obtained by multiplying the pseudo data of the normal data by the first parameter and the data obtained by multiplying the pseudo data of the abnormal data by the first parameter is maximized for each identification boundary, when the pseudo data of the normal data and the pseudo data of the abnormal data have the plurality of identification boundaries.

10. The information processing device according to claim 1, wherein each of the manufacturing devices is associated with at least two of the plurality of sensors and the normal data further comprises setting data of the manufacturing devices.

11. The information processing device according to claim 1, wherein the processing circuitry is further configured to:
perform whitening of the detection data by incorporating a correlation between variables for multivariate data, specifying a maximum value or a minimum value of a value acquired by the detection data of each sensor, and performing frequency conversion of the detection data.

12. An information processing method comprising:
acquiring detection data from a plurality of sensors, the plurality of sensors being associated with manufacturing devices;
generating pseudo data of normal data and pseudo data of abnormal data, on the basis of the normal data, similar data of the normal data, the abnormal data, and similar data of the abnormal data, the normal data comprising the detection data, the similar data of the normal data and the similar data of the abnormal data having a similarity degree with past normal data and past abnormal data respectively;
updating a first parameter that is multiplied by the pseudo data of the normal data to obtain an abnormality degree of the pseudo data of the normal data and multiplied by the pseudo data of the abnormal data to obtain an abnormality degree of the pseudo data of the abnormal data; and
updating a second parameter that is multiplied by the normal data to obtain the similar data of the normal data and a third parameter that is multiplied by the abnormal data to obtain the similar data of the abnormal data, wherein
the first parameter is updated such that a difference between data obtained by multiplying the pseudo data of the normal data by the first parameter and data obtained by multiplying the pseudo data of the abnormal data by the first parameter is maximized; and
the second parameter and the third parameter are updated such that the difference between the data obtained by multiplying the pseudo data of the normal data by the first parameter and the data obtained by multiplying the pseudo data of the abnormal data by the first parameter is maximized.

13. The information processing method according to claim 12, further comprising:
storing the normal data among present setting data into a first memory;
storing the abnormal data among the present setting data into a second memory;
storing data input in the past into a third memory; and
selecting the similar data of the normal data obtained by multiplying the normal data stored in the first memory by the second parameter and the similar data of the abnormal data obtained by multiplying the abnormal data stored in the second memory by the third parameter, from the third memory.

14. The information processing method according to claim 13, further comprising:
generating feature extraction data in which features of data read from the first memory and the second memory are extracted, wherein
the selecting the similar data selects the similar data of the normal data and the similar data of the abnormal data obtained by multiplying the feature extraction data by the second parameter and the third parameter, from the third memory.

15. The information processing method according to claim 12, further comprising:
multiplying the pseudo data of the normal data and the pseudo data of the abnormal data by the first parameter to calculate the abnormality degree of the pseudo data of the normal data and the abnormality degree of the pseudo data of the abnormal data; and
outputting a determination result on whether the pseudo data of the normal data and the pseudo data of the abnormal data are normal or abnormal, on the basis of the calculated abnormality degrees.

16. The information processing method according to claim 12, further comprising:
repeating updating of the first parameter by a first update circuitry and updating of the second and third parameters by a second update circuitry by a predetermined number of times and performing visualization of the pseudo data of the normal data and the pseudo data of the abnormal data by using the first, second, and third parameters after the repetition of updating by the predetermined number of times.

17. The information processing method according to claim 16, wherein
the performing visualization visualizes information on an identification margin representing a difference between the pseudo data of the normal data and the pseudo data of the abnormal data.

18. The information processing method according to claim 16, wherein
the performing visualization visualizes a first curve representing a time change of the similar data of the normal data and a second curve representing a time change of the similar data of the abnormal data.

19. The information processing method according to claim 12, wherein
the updating the first parameter updates the first parameter such that a difference between data obtained by multiplying the pseudo data of the normal data by the first parameter and data obtained by multiplying the pseudo data of the abnormal data by the first parameter is maximized for each identification boundary, when the pseudo data of the normal data and the pseudo data of the abnormal data have a plurality of identification boundaries, and
the updating the second parameter updates the second and third parameters such that the difference between the data obtained by multiplying the pseudo data of the normal data by the first parameter and the data obtained by multiplying the pseudo data of the abnormal data by the first parameter is maximized for each identification boundary, when the pseudo data of the normal data and the pseudo data of the abnormal data have the plurality of identification boundaries.

20. A non-transitory computer-readable medium that stores a program that causes one or more processors to perform operations comprising:
acquiring detection data from a plurality of sensors, the plurality of sensors being associated with manufacturing devices;
generating pseudo data of normal data and pseudo data of abnormal data, on the basis of the normal data, similar data of the normal data, the abnormal data, and similar data of the abnormal data, the normal data comprising the detection data, the similar data of the normal data and the similar data of the abnormal data having a similarity degree with past normal data and past abnormal data respectively;

updating a first parameter that is multiplied by the pseudo data of the normal data to obtain an abnormality degree of the pseudo data of the normal data and multiplied by the pseudo data of the abnormal data to obtain an abnormality degree of the pseudo data of the abnormal data; and updating a second parameter that is multiplied by the normal data to obtain the similar data of the normal data and a third parameter that is multiplied by the abnormal data to obtain the similar data of the abnormal data, wherein the first parameter is updated such that a difference between data obtained by multiplying the pseudo data of the normal data by the first parameter and data obtained by multiplying the pseudo data of the abnormal data by the first parameter is maximized; and the second parameter and the third parameter are updated such that the difference between the data obtained by multiplying the pseudo data of the normal data by the first parameter and the data obtained by multiplying the pseudo data of the abnormal data by the first parameter is maximized.

* * * * *